United States Patent [19]
Greenwald

[11] 3,856,458
[45] Dec. 24, 1974

[54] METHOD AND APPARATUS FOR HEAT SOFTENING PLASTIC ARTICLES

[75] Inventor: Harry Greenwald, Chicago, Ill.

[73] Assignee: Craftics, Inc., Chicago, Ill.

[22] Filed: Apr. 30, 1973

[21] Appl. No.: 355,634

[52] U.S. Cl. .................................. 432/5, 432/1
[51] Int. Cl. ............................................ F27b 9/28
[58] Field of Search .................. 432/1, 4, 3, 5, 6

[56] References Cited
UNITED STATES PATENTS

| | | | |
|---|---|---|---|
| 2,526,249 | 10/1950 | Martines | 432/3 |
| 3,157,718 | 11/1964 | O'Leary et al. | 432/10 |
| 3,280,428 | 10/1966 | Watts, Jr. | 432/10 |

*Primary Examiner*—John J. Camby
*Attorney, Agent, or Firm*—Ladas, Parry, Von Gehr, Goldsmith & Deschamps

[57] ABSTRACT

This invention is concerned with a method and a device for applying heat along a predetermined path on a surface of a plastic article to generate a controlled amount of heat to permit softening and forming of the article along the predetermined path.

5 Claims, 5 Drawing Figures

PATENTED DEC 24 1974  3,856,458

METHOD AND APPARATUS FOR HEAT SOFTENING PLASTIC ARTICLES

BACKGROUND OF THE INVENTION

This invention related generally to a method a device for applying heat to the surface of a plastic article to obtain forming and more particularly to a method and a device for applying a source of heat in direct contact with the plastic article.

The use of heat for the purpose of softening a plastic article such as a sheet of plastic material so that it can be bent along a desired path is well known. Any form of heat may be used as long as it can be controlled to apply the heat along a desired path where bending or forming is desired. The most popular method of applying heat to the plastic article, as far as the home craftsman is concerned, is by the use of an electric element. The electric element is mounted in a straight line and a sheet of plastic material is superposed for the absorption of the heat. Since the home craftsman does not possess any devices for controlling the amount of current flowing through the electric element, it is required that the sheet of plastic material should not come in contact with the electric element but be positioned above the element so that heat is transmitted entirely by radiation. This requires the building of a fixture which has supporting faces for maintaining the sheet of plastic material a certain distance above the electric element. The precaution of spacing the sheet of plastic material a distance away from the electric element did not always result in satisfactory results, inasmuch as the electric element may have been too hot or too cold, thereby resulting in improper softening of the sheet of plastic material. Another disadvantage associated with this type of heat application was that a large portion of the heat generated by the electric element was lost in the surrounding space rather than effectively contributing to the softening of the sheet of plastic material.

SUMMARY OF THE INVENTION

The invention comprises a method and a device for applying heat in direct contact with the surface of a plastic article such as a sheet of plastic material, for example, such as acrylic material (Plexiglass, Lucite, Acrylite, etc.), the heat being applied in the area wherein it is desired to impart bending to the article.

One of the objects of the invention is to provide a method for applying heat in direct contact with the surface of the plastic article.

A further object of the invention is to provide a device for applying heat directly and in contact with the surface of the plastic article which it is desired to bend in a predetermined area.

Another object of the invention is the application of a controlled amount of heat so that bending of a sheet of plastic material can be achieved without flowing of the plastic material with too much heat or forming an improperly bending with insufficient heat.

DESCRIPTION OF THE DRAWINGS

The method and the device will not be described in reference to the accompanying Figures wherein.

DESCRIPTION OF THE PREFERRED METHOD AND EMBODIMENT

Figure 1:
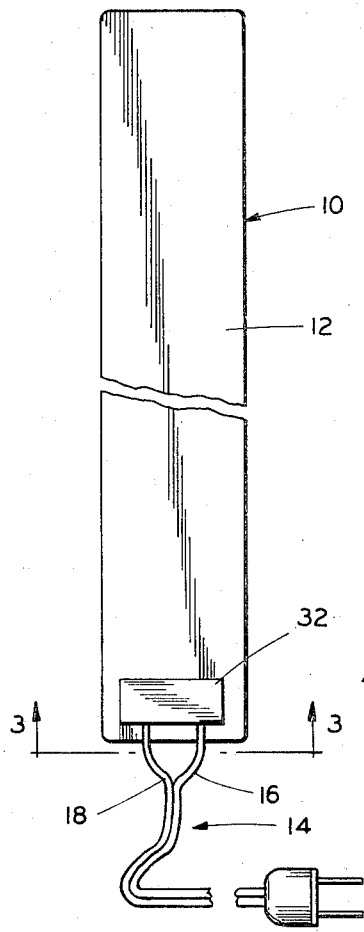
FIG. 1 is a plan view of a heating device, namely a strip heater, which is used for softening a plastic article such as a sheet of plastic material along a predetermined path along which the sheet is desired to be bent.
Figure 2:
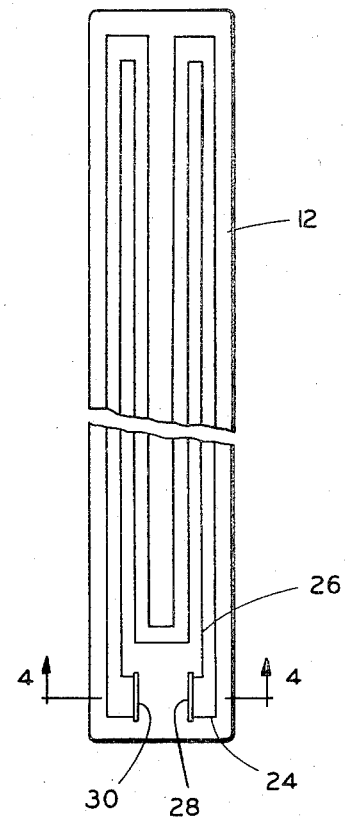
FIG. 2 is a partial plan view of the strip heater having an upper surface removed to expose the internal arrangement of electric resistance wires.

As shown in FIG. 1, a strip heater 10 comprises an elongated member 12 having a rectangular shape and having at one end thereof an electric connector 14 comprising a pair of insulated leads 16 and 18 connected at one end to an outlet plug 20 and at the other end to the member 12. The strip heater 10 is electrically heated by a number of electric resistance wires arranged in an elongated heating pattern in a plane, for example, as shown in FIG. 2, wherein a pair of electric resistance wires 24 and 26 are connected in parallel, at the ends thereof, to a pair of terminals 28 and 30. Although only one pair of electric resistance wires is shown, it is apparent that any number of electric resistance wires may be used, depending on the requirements of a particular task. And, of course, other than parallel electrical wiring arrangements may be used.

Figure 3:
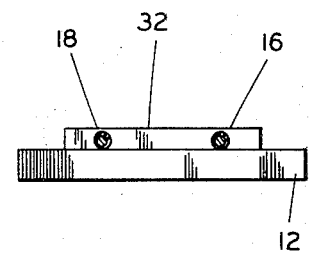
FIG. 3 is a cross section along line 3—3 of the strip heater of FIG. 1.

The leads 16 and 18 can be connected to the terminals 28 and 30 in any number of ways, for example by brazing, soldering or mechanical clinching. This connection of the insulated leads 16 and 18 with the terminals 28 and 30 is protected and sealed by a flap 32 which adheres to the top surface of the member 12, as best viewed in FIG. 3. The flap 18 is made of rubber or other mastic material that flows under application of heat and fuses the leads 16, 18 to the elongated member 12. It is apparent that other types of construction may be utilized for connecting a source of power to the electric resistance wires 24, 26 disposed within the elongated member 12. As an example, the leads 16, 18 maybe molded directly within the member 12, without the use of the flap.

Figure 4:
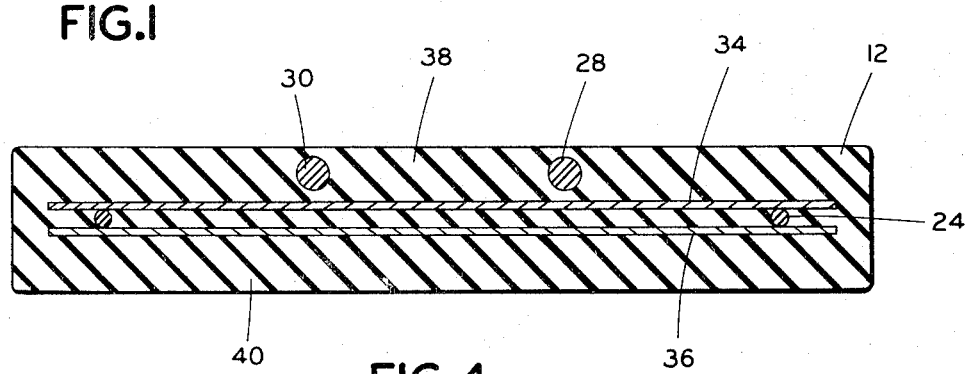
FIG. 4 is a highly enlarged view along line 4—4 of the strip heater shown in FIG. 2.

The disposition of the electrical resistance wires within the member 10 is best shown in FIG. 4 wherein, for example, the resistance wire 24 is supported between two spaced layers of heat resistant members, such as fabrics 34 and 36, generally in the middle of the dimension establishing the thickness of the elongated member 12. The entire arrangement, as viewed in FIG. 4, is encapsulated in a sheath of silicone rubber which impregnates the members 34 and 36. Although other arrangements may be used for positioning the electric resistance wires within the body of the strip heater, it is generally preferable to position the wires midway within the thickness of the elongated member 12 so that the heat generated within the resistance wire will have to pass through a certain thickness forming a thermal barrier. For example, a portion 38 of the silicone rubber above the heat resistant fabric 34 constitutes one thermal barrier and a portion 40 below the heat resistant fabric 36 constitutes the other thermal barrier. The heat resistant fabric 36 can be considered as a spacing agent having a certain thickness so that, even during faulty manufacturing of the strip heater, the electric resistance wires will never be exposed at the surfaces of the strip heater 10.

For most applications in the home workshops, the most convenient size is where the strip heater 10 is one inch wide by 24 inches in length and possesses a thickness of 0.050 of an inch. The electric resistance wires 24 and 26 are laid out in any design or pattern which will provide a wattage distribution of about 5 watts per square inch. The wattage denisty has been selected so that the sheath of the strip heater 10, during operation, is maintained at about 280° F.

Figure 5:
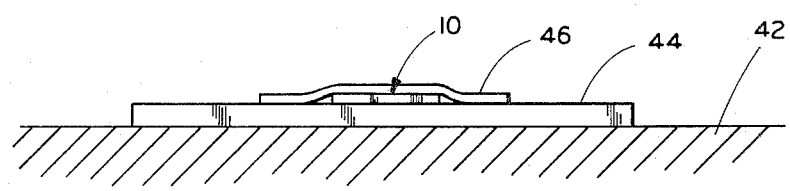
FIG. 5 shows an end view of the strip heater positioned atop a sheet of plastic material and convered with a thermal barrier preparatory to application of heat to the sheet.

Assuming that it is desired to form a bend or a corner in a sheet 44 of plastic material, referring to FIG. 5, the sheet 44 is placed on a flat, heat resistant work surface 42 which forms a thermal barrier under the sheet. Then, the strip heater 10 is placed in direct contact with the sheet and is positioned along a straight line in the region where the bend is desired to be formed in the sheet, thus forming a source of line heat. A piece of heat resistant material 46 is placed over the strip heater to hold it in firm contact with the sheet of plastic material and thereby forming a heat barrier. For example, if the sheet 44 is not too long, a book may serve well as the heat resistant material 46. Plug in the strip heater into a source of electric power and heat the sheet until it is soft enough to bend with little effort. Approximately 30 minutes will be required to sufficiently heat a sheet of acrylic plastic material which is ¼ inch thick. Bend the sheet to the desired angle and hold it until it cools. For this purpose, a square bar may be used for effecting a sharp bend or a round dowel or bar for effecting a radius bend. Care should be exercised in using the strip heater inasmuch as the surface can reach a temperature of about 280° F.

In the alternative, the strip heater 10 may be placed on the heat resistant material 42, then the sheet 44 is placed atop the material 42, and then the heat resistant material 46 is placed over the sheet 44 and positioned over the strip heater 10.

Another method of pre-heating the sheet of plastic material in a localized area consists in the use of passing steam through a conduit, for example, a pipe one-inch in diameter and covered with a thermal barrier such as 1/16 inch thickness of silicone rubber. The pipe is flexibly connected to a source of steam and is suspended in such way as to permit the raising of the pipe or swinging it to one side so that a sheet of plastic material may be placed on the heat resistant work surface underneath the suspended position of the pipe which is then positioned atop the sheet. To facilitate the softening of the sheet of the plastic material, a heat-resistant blanket forming a thermal barrier is placed over the pipe for trapping the heat between the sheet and the blanket. Since the pipe is encased in its individual thermal barrier, it is not too essential that the temperature of the steam passing therethrough be precisely controlled.

A more effective use of a steam pipe can be obtained using a pipe made entirely of silicone rubber impregnating a heat resistant fabric cylinder internally reinforced with a spiral steel wire which will readily deflect when a transverse force is applied thereto. In this case, a sheet of plastic material is placed on a heat-resistant work surface, then the silicone rubber pipe conducting the steam is positioned over the line where a bend is desired to be made. A thermal blanket of heat resistant material is placed over the pipe and then a weight is placed on top of the thermal blanket to slightly deform the pipe which assumes an oval cross-sectional shape, thereby realizing a large contact area with the surface of the sheet of plastic material. After a period of waiting, the pipe is uncovered and the sheet removed for forming operation, as previously described.

It should be noted that the thermal barrier established between the source of line heat and the contacted sheet of plastic material controls the amount of heat transmitted to the sheet, without deleteriously affecting the surface of the sheet.

Although the strip heater 10 was described in connection with forming a plastic sheet 44, it has many other applications. For example, the strip heater 10 may be spirally wound around an elongated article such as a bar or cylinder of plastic material and heat restricted material thereafter wrapped around. This would enable one to soften the elongated article so that it could be formed into a desired shape.

The physical dimensions and the power output characteristic of the preferred embodiment of the invention have already been indicated, however, it should be borne in mind that these can be changed depending on the size and shape of the plastic article which it is desired to form or shape.

Although preferred embodiments of this invention are illustrated, it should be understood that various modifications and rearrangement of parts may be resorted to without departing from the scope of the invention disclosed and claims herein.

I claim:

1. A method of applying heat along a predetermined path on a surface of a plastic article, comprising the steps of directing heat through an intervening limited thermal barrier along said predetermined path and in direct contact with said surface of said plastic article, convering said limited thermal barrier with a further thermal barrier, and maintaining the direction of said heat for a predetermined period of time to obtain localized softening of said article immediately below the surface of said limited thermal barrier.

2. A method according to claim 1, wherein the directing of the heat comprises the step of flowing electric current through said limited thermal barrier.

3. A method according to claim 1, wherein the directing of the heat comprises the step of flowing steam through said limited thermal Barrier.

4. A method according to claim 1, wherein said article comprises a sheet of plastic material, and including the steps of placing a working thermal barrier on top of a working surface, and placing said sheet of plastic material on top of said working thermal barrier before directing said heat on the other side of said sheet of plastic material.

5. A method according to claim 1, wherein said article comprises a sheet of plastic material, and including the step of entrapping the heat developed along the line of contact between said limited thermal barrier and said plastic sheet.

* * * * *